R. L. DAVIDSON.
LAWN MOWER SHARPENER.
APPLICATION FILED AUG. 26, 1915.

1,191,160.

Patented July 18, 1916.
2 SHEETS—SHEET 1.

WITNESSES:

Raleigh L. Davidson
INVENTOR

ATTORNEYS

R. L. DAVIDSON.
LAWN MOWER SHARPENER.
APPLICATION FILED AUG. 26, 1915.
1,191,160.
Patented July 18, 1916.
2 SHEETS—SHEET 2.
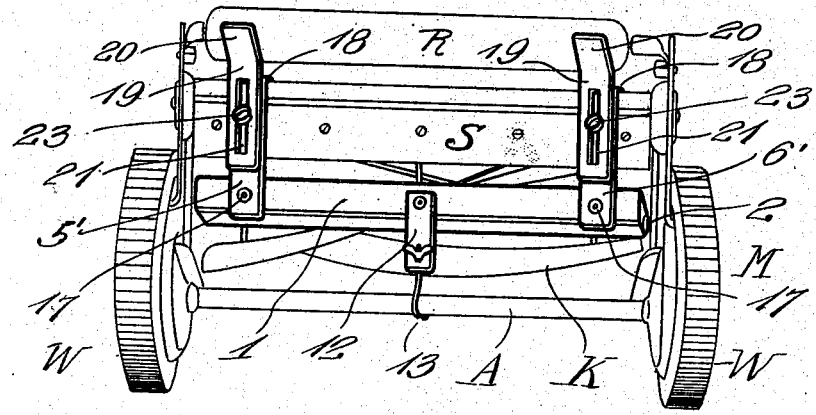
Fig. 3.
Fig. 4.
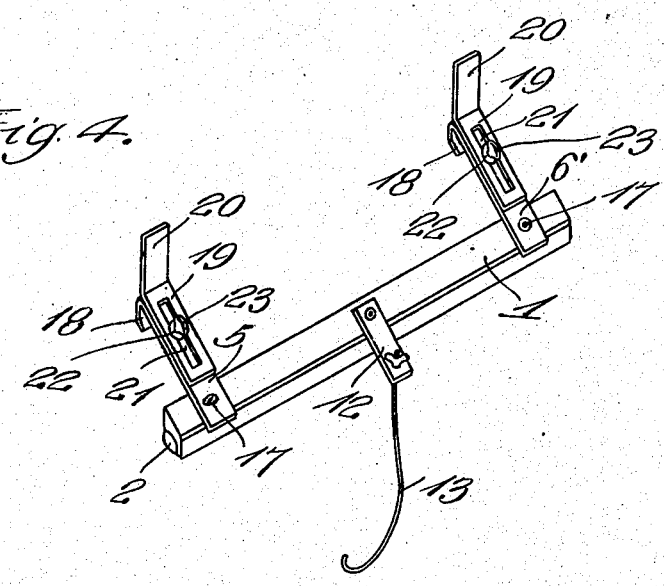
Raleigh L. Davidson.
INVENTOR
WITNESSES:
Richard L. Merrick
John H. Woodward
by
H. B. Willson &co
ATTORNEYS
THE NORRIS PETERS CO., PHOTO-LITHO., WASHINGTON, D. C.

UNITED STATES PATENT OFFICE.

RALEIGH L. DAVIDSON, OF PORTLAND, OREGON.

LAWN-MOWER SHARPENER.

1,191,160. Specification of Letters Patent. Patented July 18, 1916.

Application filed August 26, 1915. Serial No. 47,515.

*To all whom it may concern:*

Be it known that I, RALEIGH L. DAVIDSON, a citizen of the United States, residing at Portland, in the county of Multnomah and State of Oregon, have invented certain new and useful Improvements in Lawn-Mower Sharpeners; and I do declare the following to be a full, clear, and exact description of the invention, such as will enable others skilled in the art to which it appertains to make and use the same.

This invention relates to improvements in lawn mowers and more particularly to sharpeners for a mower of the class in which rotary knives are used.

The main object of the invention is to provide means which may be quickly attached to a lawn mower for sharpening the blades thereof and thereby avoid the necessity of disassembling the machine to remove the blades.

Another object is to provide a device of this character which may be attached and used by an unskilled workman and which will sharpen the mower in a very few minutes by simply rotating the blades or knives against the grinding element of the attachment.

With these and other objects in view, the invention consists of certain novel features of construction, and the combination and arrangement of parts as will be more fully described and claimed.

Figure 1:
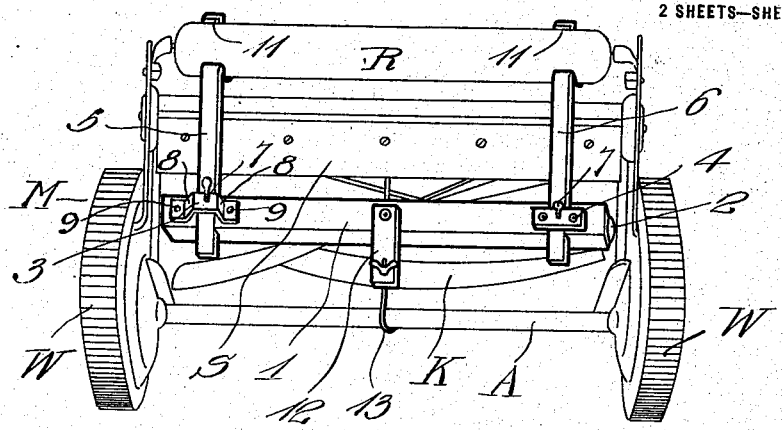
Figure 2:
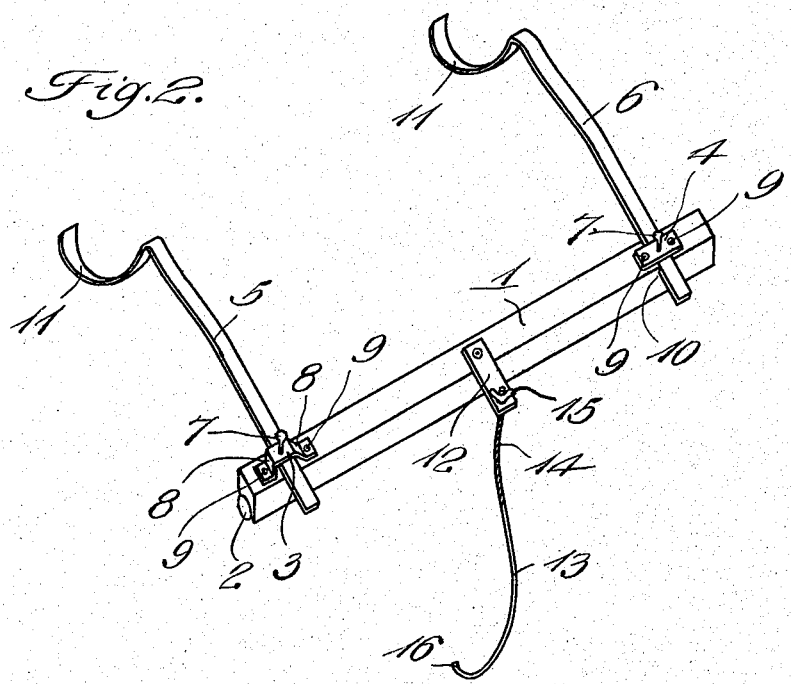

In the accompanying drawings: Figure 1 represents an end view of a lawn mower equipped with this improved sharpener, the model being in reversed position with the handle lying on the ground and the wooden gage roller which normally rests on the ground when in use shown uppermost; Fig. 2 is a perspective view of one form of the sharpener attached; Fig. 3 is an end view of a lawn mower showing a sharpener applied thereto, the means for attaching it being slightly different from that shown in the other figures; Fig. 4 is a detail perspective view of the sharpener shown in Fig. 3.

In the embodiment illustrated in Figs. 1 and 3 a mower M of ordinary rotary type is shown which need not be described in detail as it forms no part of the invention.

A represents the axle connecting the ground or transporting wheels W while R is the wooden gage roller which normally travels on the ground and S is the shear bar while K represents the knives or blades to be sharpened.

The sharpener constituting this invention and shown in Figs. 1 and 2 constitutes a cross bar 1 which may be of wood or metal and of any desired configuration in cross section being here shown square and of a length corresponding substantially to the length of the rotary knives K. This bar 1 has a grinding or sharpening element 2 secured thereto by any suitable means and here shown extending longitudinally throughout the full length thereof on its lower face. This shapening element may be composed of carborundum, abrading stone or any suitable material and is designed to bear against the knives K of the mower and be held under slight tension so that when the knives are revolved thereagainst it will sharpen them producing a square, even and proper bevel. This sharpener carrying bar 1 is shown provided on its upper face opposite that carrying the grinding elements 2 with keepers 3 and 4 arranged near opposite ends thereof and which are designed for adjustably connecting with said bar spring attaching arms 5 and 6 which extend under said keepers and are held in adjusted position by set screws 7. The keeper 3 at the left of the bar is here shown in the form of a substantially inverted U-shaped strap having laterally extending apertured feet 8 at the free ends thereof which bear on the upper face of the bar 1 and are connected thereto by screws or other suitable fastening elements 9, the arm 5 passing through the outwardly or laterally extending bowed portion of the strap and clamped against the bar 1 by the thumb screw 7.

The keeper 4 at the right of the bar is shown in the form of a flat plate having apertured ends to receive the fastening elements 9, said plate resting flat against the upper face of the bar 1, said bar being notched or rabbeted as shown at 10 to slidably receive the spring arm 6 and which is clamped under said keeper by a thumb screw 7. Either one of these forms of keeper may be employed or both as herein shown, it being optional with the user.

The spring attaching arms 5 and 6 may be of any suitable or desired length and composed of any suitable resilient metal and are equipped at their outer free ends with curved U-shaped roller engaging fingers 11, the curvature of which conforms to the curvature of the roller R and under which said fingers are designed to be passed and securely engaged with said roller as is shown clearly in Fig. 1. The arms 5 and 6 between their points of attachment with the bar 1 and their fingers 11 bear against the shear bar S.

A spring metal brace 12 in the form of a rectangular plate or bar is shown attached at one end to the upper face of the cross bar 1 intermediate of its ends preferably midway the length thereof. This bar 12 extends laterally from the bar 1 in a direction opposite to that in which the arms 5 and 6 extend and to the free end thereof is connected an attaching element in the form of a rod 13 having one end threaded as shown at 14 and extended through an aperture in the free end of the bar 12 and is secured in engagement therewith by a wing nut 15. The free lower end of this rod 13 is hook shaped as shown at 16, said hook being designed to engage the axle A which connects the wheels of the mower and whereby the sharpener is yieldably held in engagement with the rotary knives K, the tension under which it is held being controlled by adjusting the rod 13 by means of a nut 15, the shortening of said rod causing the sharpening element 2 to bear with greater force against the knives while the lengthening thereof will diminish said force.

When the device is applied as shown in Fig. 1 all that is necessary to sharpen the knives is to move the mower so as to cause said knives to revolve against the sharpening element 2 whereby a cutting edge is easily and quickly ground on the knives.

In the form shown in Figs. 3 and 4 the cross bar 1, sharpener 2, bar 12 and connector or attaching element 13 are the same as those shown in Figs. 1 and 2, the means for connecting the bar 1 with the roller and shear bar of the mower being different. This connecting means comprises two spring metal arms 5' and 6' which are engaged with the upper face of the cross bar 1 at their inner ends by means of fastening elements here shown in the form of screws 17. The arms 5' and 6' are provided at their free ends with downturned inwardly extending hooks 18 which are designed to engage the outer edge of the shear bar S as is shown clearly in Fig. 3. Adjustably mounted on the arms 5' and 6' are metal braces 19 here shown with upturned fingers 20 extending from their free ends at an angle thereto and which are designed to bear against the roller R of the mower when the attachment is in operative position to assist in retaining it in place. The braces 19 are longitudinally slotted as shown at 21 and are adjustably connected with the arms 5' and 6' by bolts 22 which pass through said slots 21 and are provided on their free ends with thumb nuts 23 and by means of which the braces 19 may be adjustably connected with the said arms 5' and 6'.

In the use of this form of sharpener the operation is the same as that above described, the hooks 18 being engaged with the shear bar S and the fingers 20 bearing against the roller R while the attaching rod 13 has its hook 16 engaged with the axle A for yieldably holding the sharpening element 2 for engagement with the knives K.

I claim as my invention:

1. A sharpening attachment for lawn mowers comprising a cross bar, a grinding element carried thereby, spring arms extending laterally from said bar in one direction near opposite ends thereof, means carried by said arms for connecting them to a supporting member, a resilient arm extending laterally from said bar in a direction opposite to said first mentioned arms and in substantially the same plane, and an attaching member adjustably connected with said last mentioned arm and having means for engaging a support.

2. A lawn mower sharpener comprising a cross bar having a sharpening element secured to one face thereof and extending throughout its length, spring arms detachably connected at one end to the opposite ends of said cross bar, and provided at their free ends with hooks for engaging a member of the mower, a spring arm extending laterally from said cross bar in a direction opposite to said first mentioned arms and arranged midway the length of said arm, a rod detachably connected at one end with the other end of said last mentioned arm and having a hook at its free end for detachable engagement with a support on a mower.

3. A lawn mower sharpener comprising a cross bar having a sharpening element secured to one face thereof and extending throughout its length, spring arms adjustably connected at one end to the opposite ends of said cross bar and provided at their free ends with U-shaped upwardly extending hooks for engaging the roller of a mower, a spring arm extending laterally from said cross bar in a direction opposite to said first mentioned arms and arranged midway the length thereof, a rod adjustably connected at one end with the free end of said last mentioned arm and having a hook at its free end for adjustable engagement with the support on a mower.

In testimony whereof I have hereunto set my hand in presence of two subscribing witnesses.

RALEIGH L. DAVIDSON.

Witnesses:
R. L. MERRICK,
R. E. BOGART.

Copies of this patent may be obtained for five cents each, by addressing the "Commissioner of Patents, Washington, D. C."